United States Patent [19]

Yamada et al.

[11] Patent Number: 5,438,701

[45] Date of Patent: Aug. 1, 1995

[54] MOBILE RADIO APPARATUS

[75] Inventors: Daisuke Yamada, Kawasaki; Osamu Kato, Yokohama; Kazuyuki Miya; Taku Nagase, both of Machida, all of Japan

[73] Assignee: Matsushita Electric Industrial Co., Ltd., Osaka, Japan

[21] Appl. No.: 162,358

[22] Filed: Dec. 7, 1993

[30] Foreign Application Priority Data

Dec. 11, 1992 [JP] Japan .................................. 4-331520

[51] Int. Cl.$^6$ ............................................. H04B 1/38
[52] U.S. Cl. ..................... 455/89; 455/343; 379/57; 379/58
[58] Field of Search ....................... 455/33.1, 54.1, 89, 455/127, 343; 340/825.44; 379/58, 57

[56] References Cited

U.S. PATENT DOCUMENTS 5,054,052 10/1991 Nonami ............................... 455/343
5,117,449 5/1992 Metroka et al. .

FOREIGN PATENT DOCUMENTS 61-67336A 4/1986 Japan .
4057592 2/1992 Japan .
5-102924A 4/1993 Japan .
2230162 10/1990 United Kingdom .

Primary Examiner—Reinhard J. Eisenzopf
Assistant Examiner—Thanh Le
Attorney, Agent, or Firm—Spencer, Frank & Schneider

[57] ABSTRACT

When a power supply of a mobile radio apparatus is turned on, a power supply change-over switch of a power supply control unit is changed over to the side of a pager unit to turn on only a power supply of the pager unit, so that a pager network which does not require position registration is utilized to perform intermittent receiving operation with low power consumption. When there is an incoming call to the pager unit, a CPU of the power supply control unit receives an incoming control signal from a pager decoding circuit and changes over the power supply change-over switch to the side of a radio-telephone line terminal unit to turn on the radio telephone line terminal unit and turn off the pager unit. The CPU sends a control signal to a timing control circuit of the radio-telephone line terminal unit so that the position registration is performed by utilizing a mobile radio network and an operation mode of the mobile radio apparatus proceeds to a usual talking mode. After a pager calling has been performed in a calling side, the mobile radio apparatus is called by the portable telephone number and talking is then is made. When the talking has been finished, the CPU receives a control signal from the timing control circuit and changes over the power supply change-over switch to the side of the pager unit again to turn on the pager unit to enter a waiting state for reception.

3 Claims, 7 Drawing Sheets

MOBILE RADIO APPARATUS

BACKGROUND OF THE INVENTION

1. Field of the Invention

The present invention relates to a mobile radio apparatus for a portable telephone and the like which is desired to be operated with low power consumption.

2. Description of the Related Art

FIG. 7 is a schematic diagram illustrating a conventional mobile radio apparatus. As an example of the mobile radio apparatus, a portable telephone is shown. In FIG. 7, reference numerals 21 and 22 denote antennas. The antenna 21 is a receiving antenna, while the antenna 22 is operated as a transmitting antenna upon transmission and is operated as a receiving antenna upon reception to perform diversity reception together with the antenna 21. Numeral 23 denotes a receiving circuit for amplifying a received signal. Numeral 24 denotes a demodulation circuit which demodulates a baseband signal from the received signal to obtain digital data and reproduces a clock from the received signal. Numeral 25 denotes a voice decoding circuit which converts the digital data into an analog voice signal. Numeral 26 denotes a voice encoding circuit for converting an analog voice signal into a digital data. Numeral 27 denotes a modulation circuit for performing modulation in accordance with modulation systems by using the digital data. Numeral 28 denotes a transmitting circuit for amplifying a modulated signal. Numeral 30 denotes a timing control circuit for controlling the timing for the whole mobile radio apparatus.

Among operations of the mobile radio apparatus shown in FIG. 7, operation of an intermittent receiving mode upon waiting for reception and position registration, specifically, is now described. Upon waiting for reception, objects to be supplied with the clock from the timing control circuit 30 are minimized and a power supply for supplying power to the receiving circuit 23 and the demodulation circuit 24 is turned on only during slots for necessary information, while the voice decoding circuit 25, the voice encoding circuit 26, the modulation circuit 27 and the transmitting circuit 28 are put into a standby mode. In this manner, the mobile radio apparatus is switched to an intermittent receiving mode. In the intermittent receiving mode, several intermittent receiving operations are made for several hundred milliseconds and only necessary information is received, to reduce the power consumption while waiting for reception and to lengthen the waiting for reception capability for one charging of a battery. When a simultaneous calling area in which a user of the mobile radio apparatus is located is changed because of variation of a reception level due to movement of the user, the position registration is required for recognizing the position of the mobile radio apparatus to a base station of a portable telephone network for a changed simultaneous calling area and transmission is made for the position registration. The transmission is made only upon the position registration operation, while it is necessary to reduce the power consumption at this time as small as possible.

However, in the conventional mobile radio apparatus constituted by the portable telephone by way of example, the intermittent receiving operation is performed to lengthen the time capable of waiting for reception for one charging of the battery, while the waitable time is only about several tens of hours and the charging of the battery is required frequently.

Further, in order to reduce a power consumption, a mobile radio apparatus including a pager combined with the portable telephone is disclosed in JP-A-61-67336 and JP-A-5-102924. In such a mobile radio apparatus, only the pager unit is operated while waiting for reception and the portable telephone is supplied with power after a calling signal has been received, so that a reduction of power consumption during the waiting for reception is effected.

In the abovementioned papers, however, the position registration in the case where the user of the mobile radio apparatus is moved is not described. Generally, in the mobile radio apparatus such as the portable telephone, each time the simultaneous calling area in which the user of the portable telephone is located is changed to a new area, the position registration is required to recognize the position of the user of the portable telephone to the base station of the portable telephone network for the new area. Although one transmission time for the position registration is short, the power consumption for each transmission is large and this is a great problem encountered when the power consumption of the whole apparatus is made smaller.

SUMMARY OF THE INVENTION

The present invention solves the above problem in the prior art and an object of the present invention is to provide a mobile radio apparatus in which a power supply of a portable telephone unit is off and only a pager unit is operated during waiting for reception while a power supply of the pager unit is off and only the portable telephone unit is operated as needed, and the frequency of the position registration is reduced to minimize power consumption.

In order to achieve the object, according to the present invention, the mobile radio apparatus comprises a radio-telephone line terminal unit, a pager unit and a power supply control unit. During waiting for reception of a radio-telephone, a power supply of the radio-telephone line terminal unit is off and only a power supply of the pager unit, which does not require the position registration, is on. When there is an incoming call for the pager unit, the power supply control unit turns on the power supply of the radio-telephone line terminal unit and turns off the power supply of the pager unit, and then causes the radio-telephone line terminal unit to perform the position registration, and the mode is changed to a talking mode for talking. When the talking is finished, the power supply of the radio-telephone line terminal unit is turned off and the power supply of the pager unit is turned on again by means of control of the power supply control unit to enter a waiting state for reception again.

According to the present invention, since the power supply of the radio-telephone line terminal unit is off in the waiting state and the frequency of transmission for the position registration necessary for the radio-telephone line terminal unit is reduced remarkably, the power consumption of the mobile radio apparatus is advantageously reduced greatly.

DESCRIPTION OF THE PREFERRED EMBODIMENTS

Figure 1:
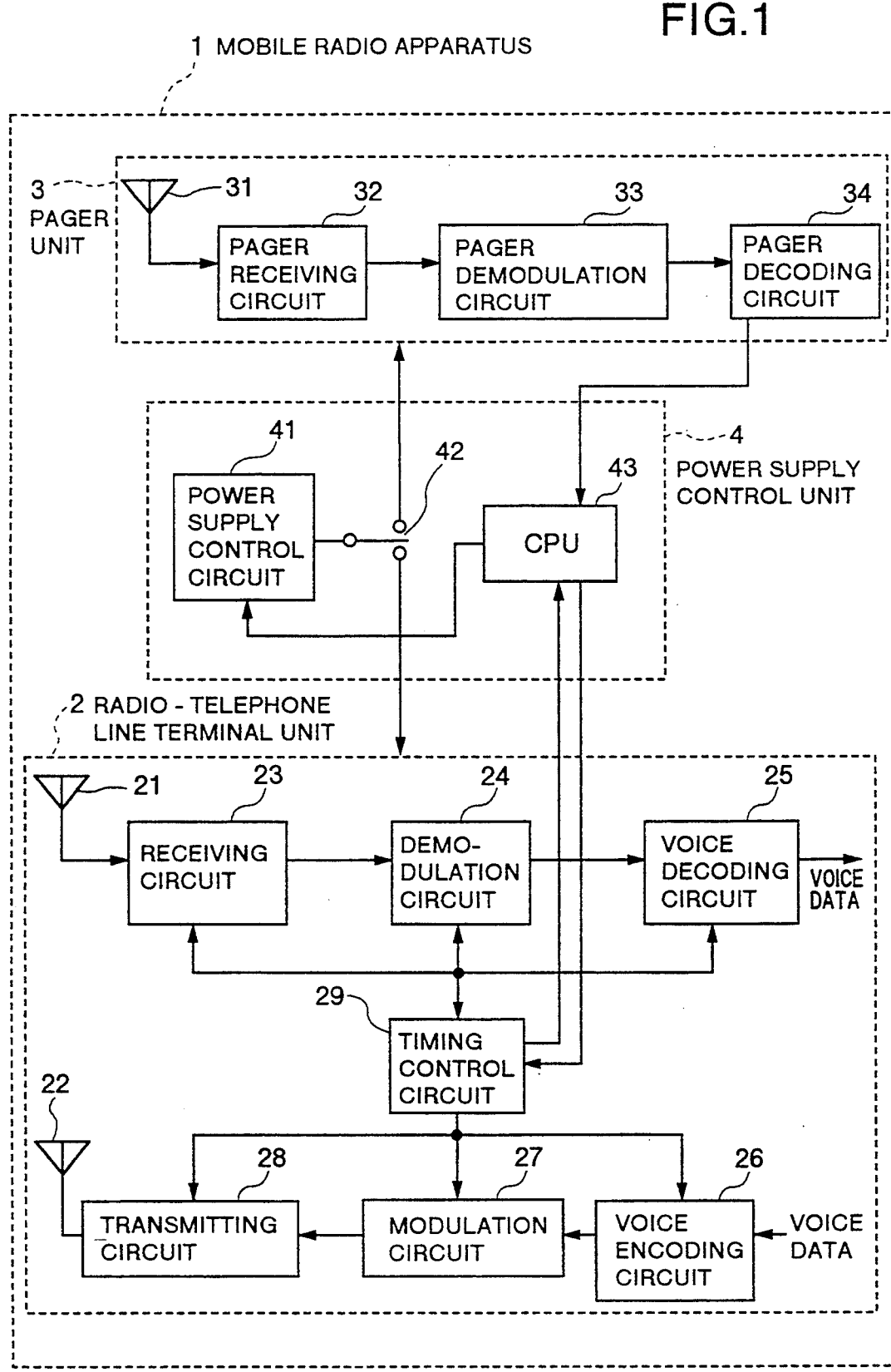
FIG. 1 is a block diagram schematically illustrating a mobile radio apparatus according to a first embodiment of the present invention.
Figure 7:
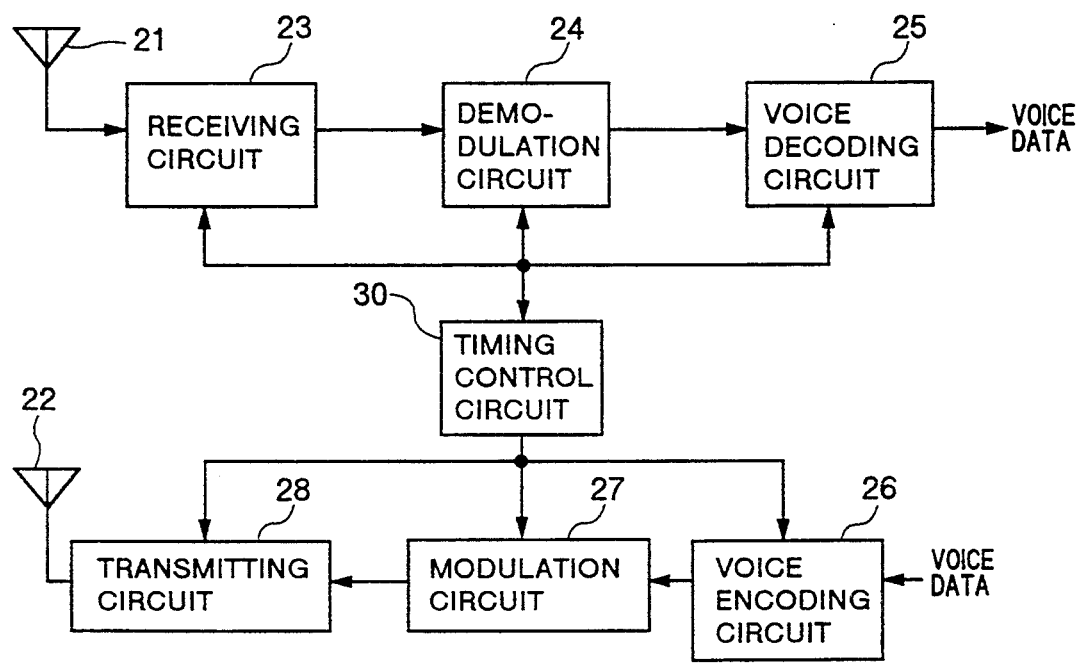
FIG. 7 is a block diagram schematically illustrating a conventional mobile radio apparatus.

FIG. 1 schematically illustrating a mobile radio apparatus according to a first embodiment of the present invention. In FIG. 1, numeral 1 denotes a mobile radio apparatus, 2 a radio-telephone line terminal unit (hereinafter referred to as a line terminal unit 2 in the description of the embodiment), 3 a pager unit, and 4 a power supply control unit for controlling turning-on-and-off of power supplies for the line terminal unit 2 and the pager unit 3. The mobile radio apparatus 1 comprises the line terminal unit 2, the pager unit 3 and the power supply control unit 4. In the embodiment, the line terminal unit 2 is described as a portable telephone for example, however, the line terminal unit 2 may be a terminal unit of another kind capable of being connected to a radio-telephone line, such as, for example, a picture communication terminal unit or a data communication terminal unit. The line terminal unit 2 includes blocks designated by reference numerals 21 to 29. The blocks designated by reference numerals 21 to 28 are the same blocks as those constituting the conventional mobile radio apparatus shown in FIG. 7 and accordingly description thereof is omitted by designating them by the same reference numerals. Reference numeral 29 denotes a timing control circuit for controlling the timing for the blocks of the line terminal unit 2. The timing control unit 29 is different from the timing control unit 30 of FIG. 7 in that the timing control unit 29 is operated by control of the power supply control unit 4. The pager unit 3 includes elements designated by reference numerals 31 to 34. Reference numeral 31 denotes an antenna of the pager unit for receiving electric waves for the pager unit and which is provided separately from the antennas 21 and 22 of the line terminal unit 2. Numeral 32 denotes a pager receiving circuit for amplifying a pager signal received by the pager antenna 31. Numeral 33 denotes a pager demodulation circuit for demodulating the pager signal. Numeral 34 denotes a pager decoding circuit for decoding the demodulated pager signal to produce an incoming control signal. The power supply unit 4 includes elements designated by reference numerals 41 to 43. Numeral 41 denotes a power supply control circuit for controlling supply of supply voltage from a battery (not shown) to one of the line terminal unit 2 and the pager unit 3 in accordance with a control signal. Numeral 42 denotes a power supply change-over switch which is controlled by the power supply control circuit 41 to be changed over so that the battery power supply is connected to either the line terminal unit 2 or the pager unit 3. Numeral 43 denotes a CPU for controlling operation of each of the portions of the mobile radio apparatus 1 in response to signals from the timing control circuit 29, the pager decoding circuit 34 and a power supply switch (not shown) of the mobile radio apparatus 1.

Figure 2:
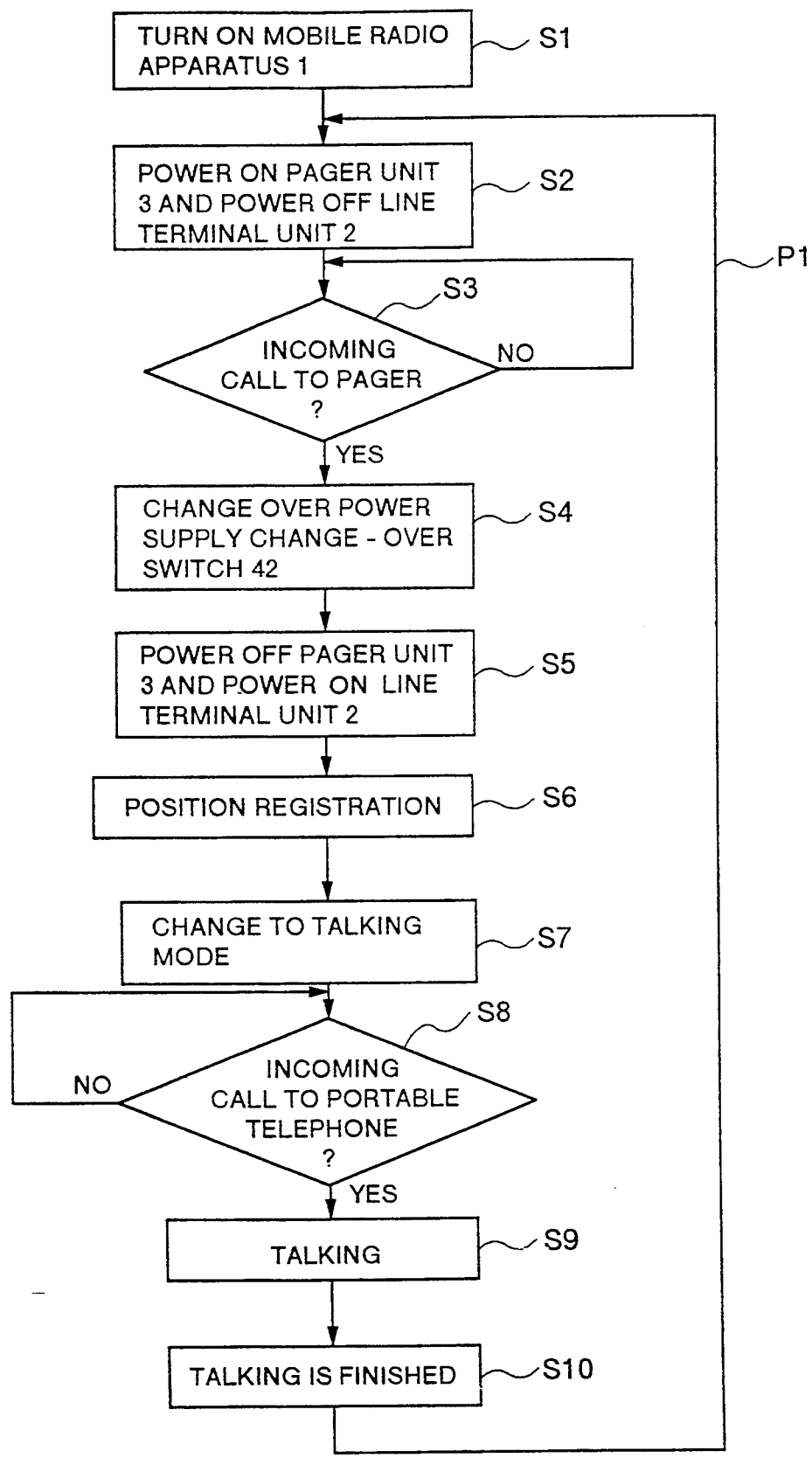
FIG. 2 is a flow chart showing operation of the mobile radio apparatus according to the first embodiment.

FIG. 2 is a flow chart showing operation of the first embodiment. Referring now to FIGS. 1 and 2, operation of the first embodiment is described. When the power supply of the mobile radio apparatus 1 is turned on by means of a power supply switch not shown (step S1), the power supply change-over switch 42 is changed over to the side of the pager unit 3 by means of the CPU 43 and the power supply control circuit 41 of the power supply control unit 4, to turn on only the power supply of the pager unit 3 (step S2) so that an intermittent receiving operation of the pager signal is accomplished with low power consumption by using the pager network which does not require position registration. When there is an incoming call to the pager unit 3 during waiting for reception (step S3), the CPU 43 receives an incoming control signal from the pager decoding circuit 34 to control the power supply control unit 41 so that the power supply change-over switch 42 is changed over to the side of the line terminal unit 2 (step S4). Consequently, the line terminal unit 2 is powered on and the pager unit 3 is powered off (step S5). Thus, the CPU 43 sends the control signal to the timing control circuit 29 of the line terminal unit 2 to thereby perform the position registration to cause the base station of the portable telephone network of the area to recognize the position of the portable telephone (step S6) and the line terminal unit 2 is moved to the usual talking mode (step S7). After the pager calling has been made, the calling side or party dials the telephone number of the portable telephone to call it, so that an incoming call arrives at the portable telephone (step S8) to thereby be able to make talking between the calling side and the called portable telephone (step S9). When the talking has finished (step S10), the CPU 43 receives the control signal from the timing control circuit 29 (path P1) and changes over the power supply change-over switch 42 to the pager unit 3 again so that the pager unit 3 is powered on and the line terminal unit 2 is powered off to enter the waiting state for reception of the pager signal (step S2).

Figure 3:
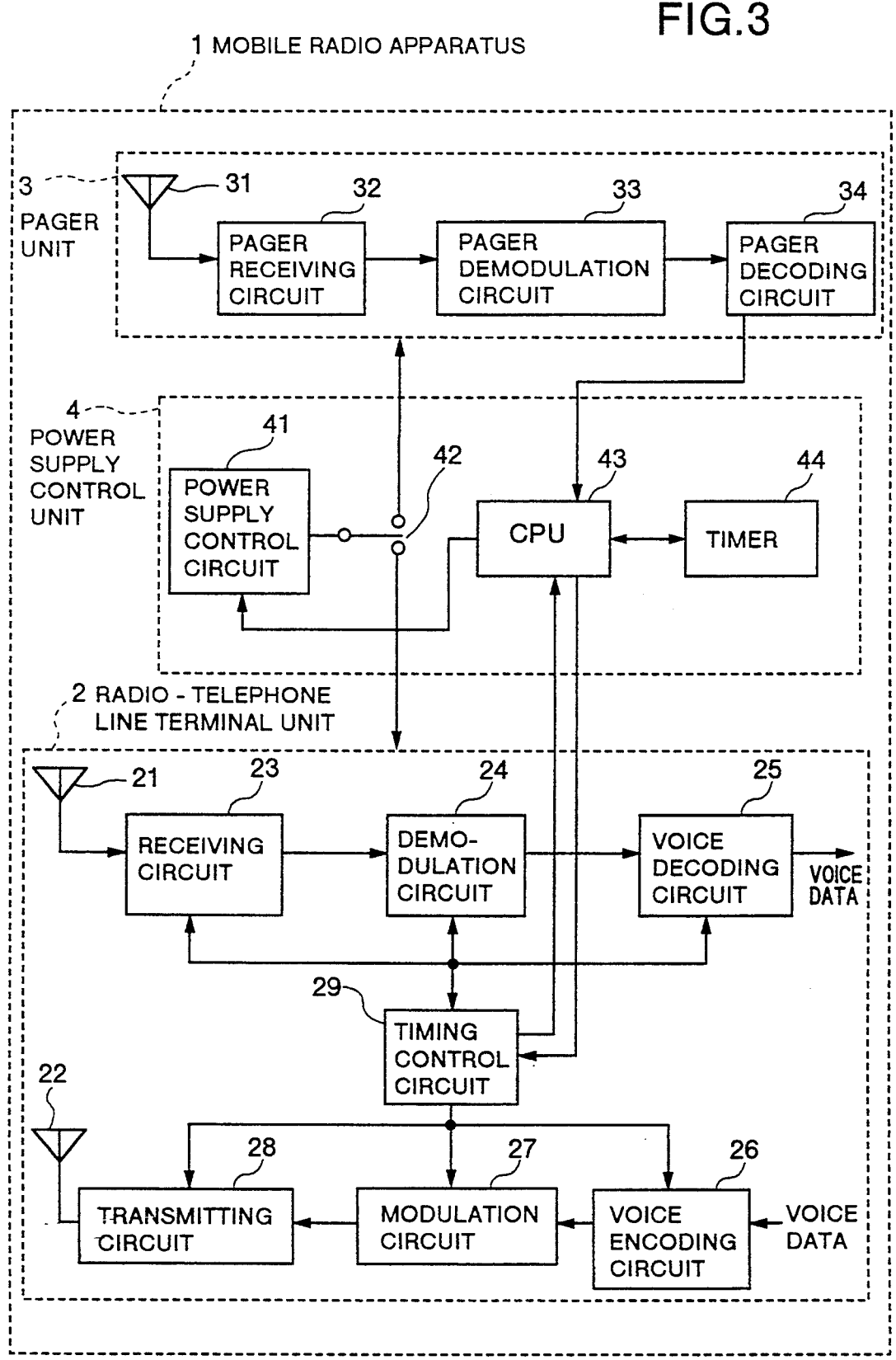
FIG. 3 is a block diagram schematically illustrating a mobile radio apparatus according to a second embodiment of the present invention.

FIG. 3 schematically illustrates a mobile radio apparatus according to a second embodiment of the present invention. In FIG. 3, a timer 44 is added to the power supply control unit 4 and performs timing control by means of the CPU 43. In FIG. 3, elements except for the timer 44 are those having the same functions as in the first embodiment and description thereof is omitted by designating them by the same reference numerals.

Figure 4:
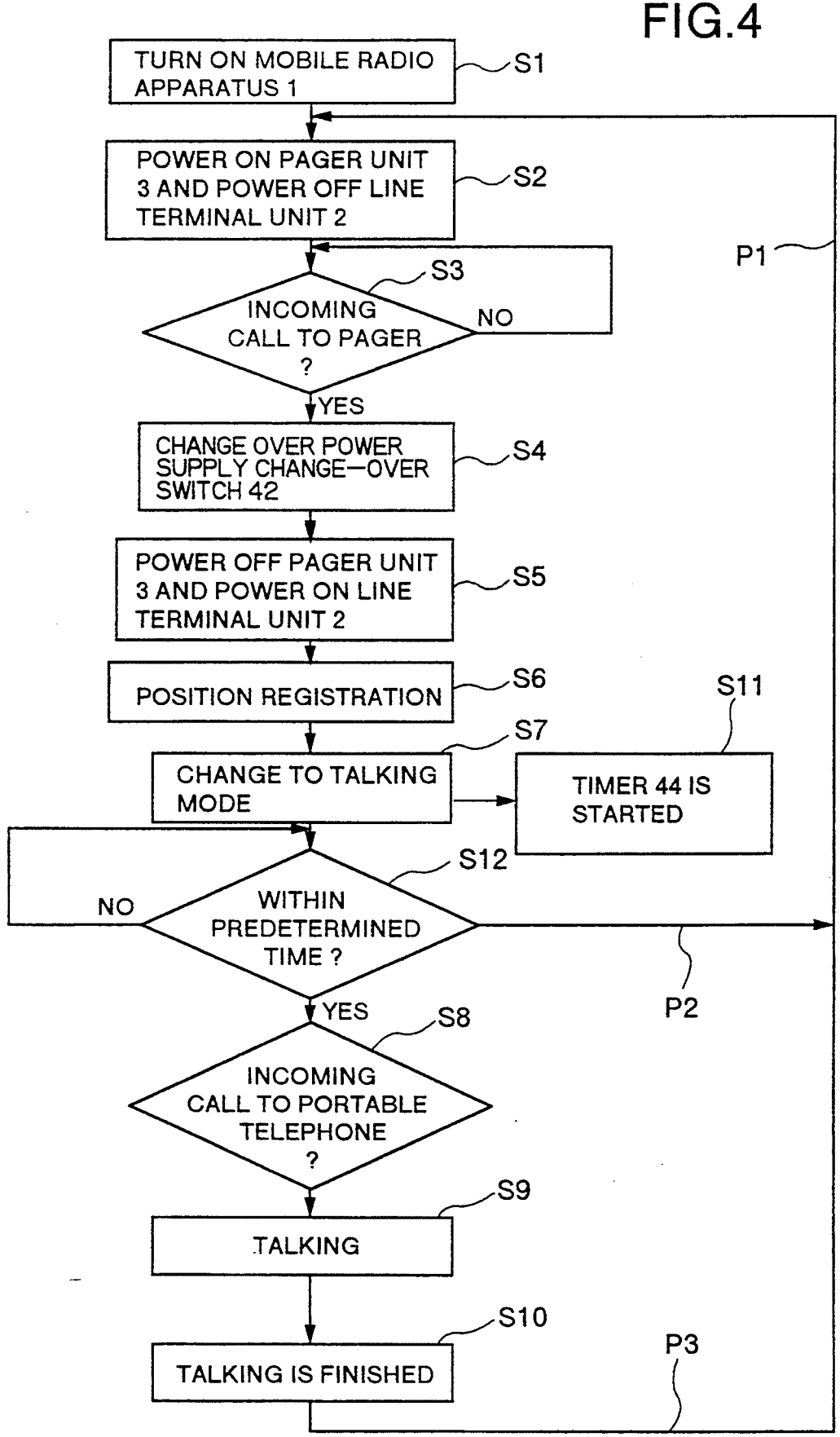
FIG. 4 is a flow chart showing operation of the mobile radio apparatus according to the second embodiment.

FIG. 4 is a flow chart showing operation of the second embodiment. Referring now to FIGS. 3 and 4, operation of the second embodiment is described. In FIG. 4, the steps S1 to S10 have the same operation as those of the first embodiment shown in FIG. 2 and description thereof is omitted by designating them by the same step numbers. In FIG. 4, when the line terminal unit 2 is moved to the usual talking mode (step 7), the timer 44 of the power supply control unit 4 starts its operation in accordance with the control of the CPU 43 (step S11). The CPU 43 monitors the timer 44 (step S12) and when an incoming call arrives at the line terminal unit 2 within a predetermined time period from the start of the operation of the timer 44 (step S8), talking is performed (step S9). When there is no incoming call within the predetermined time period (path P2) or when an incoming call arrives at the line terminal unit 2 once to thereby make talking (step S9) and the talking has been finished (step S10 and path P3), the CPU 43 receives the control signal from the timer 44 and the timing control circuit 29 (path P1) and the power supply change-over switch 42 is changed over to the side of the pager unit 3 again, so that the pager unit 3 is turned on and the line terminal unit 2 is turned off to thereby enter the waiting state for reception of the pager signal (step S2).

Figure 5:
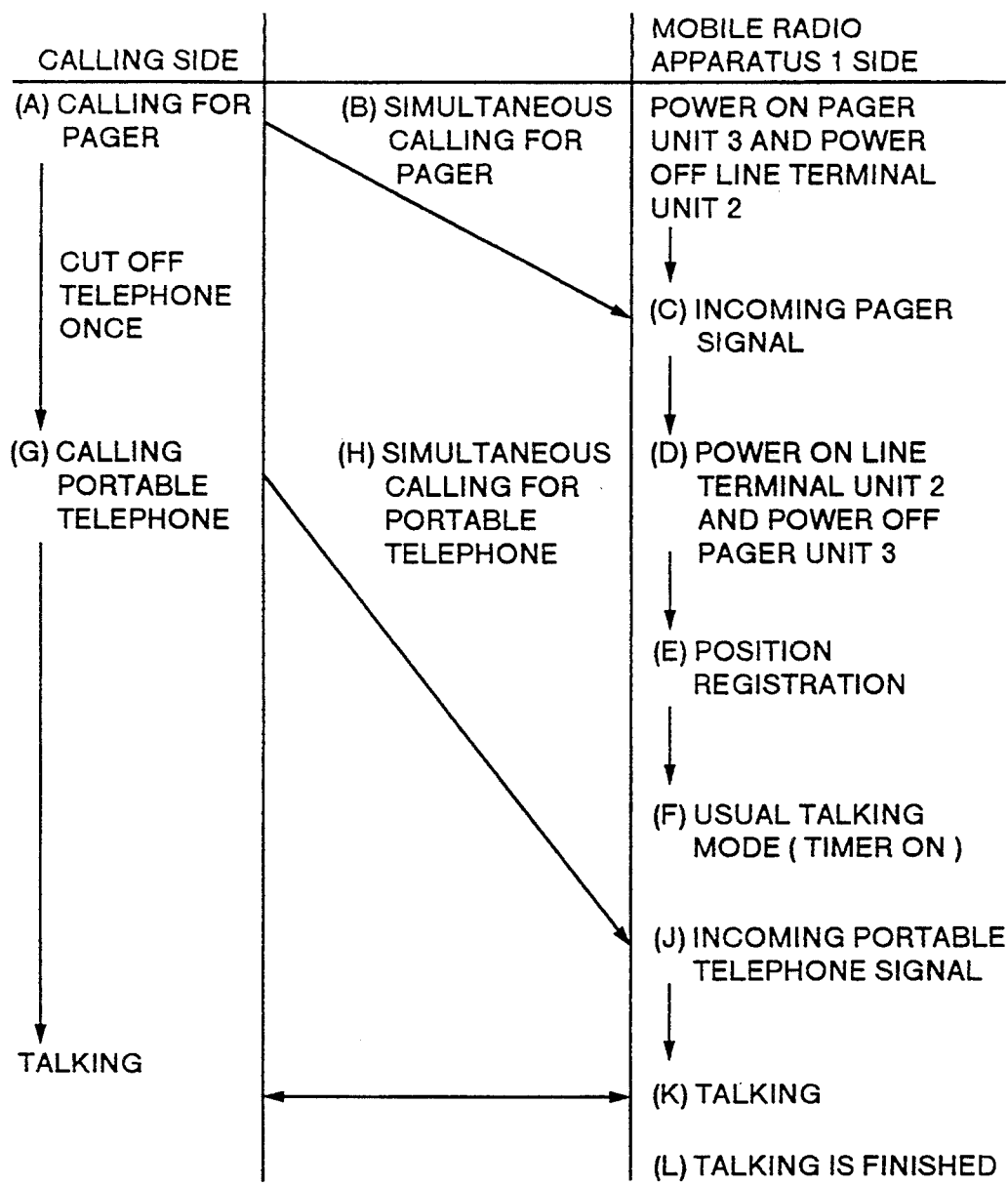
FIG. 5 is a diagram illustrating a calling procedure of the mobile radio apparatus according to the embodiments of the present invention.
Figure 6:
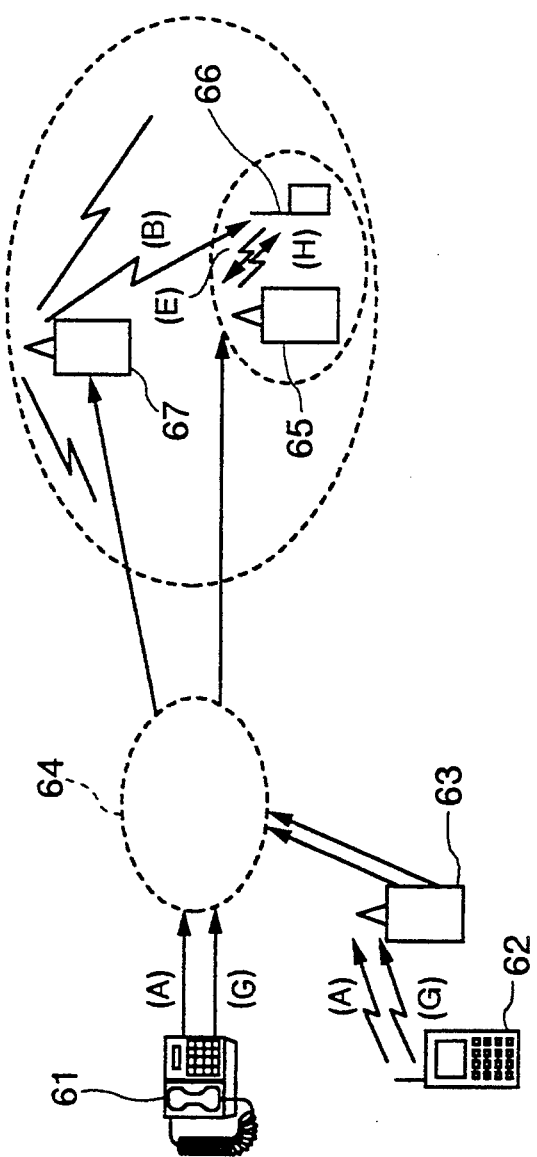
FIG. 6 is a schematic diagram illustrating a configuration of a communication network including the mobile radio apparatus according to the embodiments of the present invention.

FIG. 5 illustrates a calling procedure of the mobile radio apparatus 1 according to the first and second embodiments. FIG. 6 schematically illustrates a configuration of a communication network for the radio-telephone and the pager including the mobile radio apparatus 1 according to the first and second embodiments. Letters (A) to (L) shown in FIG. 5 correspond to letters (A) to (L) shown in FIG. 6, respectively.

In FIG. 6, reference numeral 61 denotes a fixed telephone, 62 a portable telephone, 63 a base station for the portable telephone, 64 a public telephone network, 65 a base station for a mobile radio apparatus, 66 the mobile radio apparatus, and 67 a base station for a pager.

Referring now to FIGS. 5 and 6, the calling procedure of the mobile radio apparatus according to the first and second embodiments is described. The calling side or party calls the mobile radio apparatus 1 through the pager network (process A). Thus, the pager base station performs the simultaneous calling for the pager (process B). The mobile radio apparatus 1 receives an incoming pager signal (process C), and turns on the power supply of the line terminal unit 2 and turns off the power supply of the pager unit 3 (process D) so that the position registration is performed (process E). Then, the mobile radio apparatus 1 is moved to the usual talking mode (process F). Thus, the calling side cuts off the telephone once and performs the calling of the portable telephone (process G). Thus, the simultaneous calling is performed through the public telephone network as the portable telephone (process H), so that an incoming portable telephone call is received by the mobile radio apparatus 1 (process J). Talking is then made (process K) and when the talking has finished (process L) and the mobile radio apparatus is moved to the waiting state for reception, the mobile radio apparatus turns off the power supply of the line terminal unit 2 and turns on the power supply of the pager unit 3 again.

As described above, according to the first and second embodiments, the power supply of the line terminal unit 2 is turned off and only the power supply of the pager unit 3 is turned on during waiting for reception to thereby enter the waiting state for reception for the paper which does not require the position registration. When an incoming signal of the pager is received, the line terminal unit 2 is turned on and the pager unit 3 is turned off to perform the position registration and move to the usual talking mode. Thus, since the power consumption by the transmission for the position registration during waiting for reception can be removed entirely, the power consumption of the mobile radio apparatus 1 can be reduced and the waiting time for reception by one charging can be lengthened.

In the first and second embodiments, the calling side first performs the pager calling and then performs the calling of the portable telephone, while one-to-one correspondence of the pager number and the telephone number of the portable telephone can cause the mobile radio apparatus 1 to be automatically moved to the talking mode only by performing the pager calling. The pager unit has the telephone number as the telephone number of the radio-telephone line terminal unit wherein the radio-telephone line terminal unit also receives a calling signal at the same time the pager unit receives the calling signal.

According to the present invention, as apparent from the embodiments, the mobile radio apparatus comprises the pager unit and the power supply control unit in addition to the radio-telephone line terminal unit and turns off the power supply of the line terminal unit during waiting for reception of the radio-telephone line to wait for reception of an incoming pager signal. When there is the incoming signal to the pager unit, the power supply control unit turns on the power supply of the line terminal unit and performs the necessary position registration. Accordingly, since it is not necessary to perform the intermittent receiving operation or the transmission for the position registration that is always performed during waiting for reception of the conventional mobile radio apparatus, the power consumption during waiting for reception can be reduced greatly and the time capable of waiting for reception by one charging can be also lengthen greatly so that the usable time of the mobile radio apparatus can be made longer.

We claim:

1. A mobile radio apparatus comprising:
   a radio-telephone line terminal unit, having a telephone number, for talking with one of a plurality of radio-telephone base stations in accordance with a position of said mobile radio apparatus and for producing a first control signal when talking of said radio-telephone line terminal unit is finished;
   a pager unit for receiving a calling signal from at least one page base station and for producing a second control signal when said pager unit receives a calling signal specifying said pager unit, said pager unit having the same telephone number as the telephone number of said radio-telephone line terminal unit wherein said radio-telephone line terminal unit also receives a calling signal at the same time said pager unit receives said calling signal;
   a power supply and selector means for supplying electric power to one of said radio-telephone line terminal unit and said pager unit, wherein said radio-line terminal unit and said pager unit are not supplied with electric power at the same time;
   a control circuit for controlling said power supply and selector means to:
   (a) supply electric power to said pager unit when said mobile radio apparatus is actuated,
   (b) supply electric power to said radio-telephone line terminal unit when said control circuit receives said second control signal from said pager unit, and
   (c) supply electric power to said pager unit again when said control circuit receives said first control signal from said radio-telephone line terminal unit.

2. A mobile radio apparatus according to claim 1, further comprising timer means, and wherein said control circuit controls said timer means to start measurement of time when said control circuit receives said second control signal from said pager unit, and controls said power supply and selector means to supply electric power to said pager unit again when an elapsed time represented by an output signal of said timer means exceeds a predetermined time period while there is no incoming signal to said radio telephone line terminal unit 3. A mobile radio apparatus according to claim 1, wherein said control circuit controls said radio-telephone line terminal unit to perform position registration for acknowledging the position of said mobile radio apparatus to at least one of said radio-telephone base stations when said control circuit receives said second control signal from said pager unit.

* * * * *